(12) United States Patent
Luke et al.

(10) Patent No.: US 8,595,468 B2
(45) Date of Patent: Nov. 26, 2013

(54) REVERSE SIMULTANEOUS MULTI-THREADING

(75) Inventors: Shawn M. Luke, Essex Junction, VT (US); John Sargis, Jr., Essex Junction, VT (US); Daneyand J. Singley, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 12/640,112

(22) Filed: Dec. 17, 2009

(65) Prior Publication Data

US 2011/0153987 A1    Jun. 23, 2011

(51) Int. Cl.
G06F 9/38    (2006.01)
G06F 9/46    (2006.01)

(52) U.S. Cl.
USPC .......................................... 712/214; 712/215

(58) Field of Classification Search
None
See application file for complete search history.

(56) References Cited

U.S. PATENT DOCUMENTS

| | | | |
|---|---|---|---|
| 5,987,587 A | 11/1999 | Meltzer | |
| 6,240,521 B1 | 5/2001 | Barber et al. | |
| 6,311,261 B1 | 10/2001 | Chamdani et al. | |
| 6,480,952 B2 | 11/2002 | Gorishek, IV et al. | |
| 6,725,354 B1 * | 4/2004 | Kahle et al. | 712/34 |
| 6,766,515 B1 | 7/2004 | Bitar et al. | |
| 6,983,389 B1 | 1/2006 | Filippo | |
| 7,117,389 B2 * | 10/2006 | Luick | 714/11 |
| 7,254,697 B2 * | 8/2007 | Bishop et al. | 712/213 |
| 7,313,674 B2 | 12/2007 | Asakawa | |
| 7,353,364 B1 | 4/2008 | Chong et al. | |
| 7,373,481 B2 | 5/2008 | Xu | |
| 7,398,374 B2 | 7/2008 | DeLano | |
| 7,890,735 B2 * | 2/2011 | Tran | 712/215 |
| 2008/0189519 A1 * | 8/2008 | Gschwind et al. | 712/213 |
| 2009/0165016 A1 * | 6/2009 | Bell et al. | 718/107 |

OTHER PUBLICATIONS

Zhong,H. etal., Extending Multicore Architectures to Exploit Hybrid Parallelism in a Single-thread Applications, 2007,IEEE. pp. 25-36.*
Ganusov,I. and M. Burtscher, Future Execution:a Prefetch Mechanism that uses Multiple Cores to Speed up Single Threads,Dec. 2006,ACM Transactions on Architecture and Code Optimization, vol. 3. No. 4., pp. 424-449.*

(Continued)

*Primary Examiner* — Eric Coleman
(74) *Attorney, Agent, or Firm* — Cantor Colburn LLP; Michael LeStrange (57) ABSTRACT

A multi-core processor system supporting simultaneous thread sharing across execution resources of multiple processor cores is provided. The multi-core processor system includes a first processor core with a first instruction queue and dispatch logic in communication with a first execution resource of the first processor core. The multi-core processor system also includes a second processor core with a second instruction queue and dispatch logic in communication with a second execution resource of the second processor core. A high-speed execution resource bus couples the first and second processor cores. The first instruction queue and dispatch logic is configured to issue a first instruction of a thread to the first execution resource and issue a second instruction of the thread over the high-speed execution resource bus to the second execution resource for simultaneous execution of the first and second instruction of the thread on the first and second processor cores.

22 Claims, 7 Drawing Sheets

(56) References Cited

OTHER PUBLICATIONS

"AMD reverse multi-threading tech 'does not exist," retrieved from the Internet on Dec. 16, 2009, http://www.reghardware.co.uk/2006/07/17/amd_reverse_ht_not_real/ (Jul. 2006), 2 pages.

"AMD said to be researching 'reverse multi-threading' tech," retrieved from the internet on Dec. 16, 2009, http://www.reghardware.co.uk/2006/04/18/amd_reverse_smt/print.html (Apr. 2006), 2 pages.

* cited by examiner

REVERSE SIMULTANEOUS MULTI-THREADING

BACKGROUND

This invention relates generally to simultaneous processing of computer instructions, and more particularly to simultaneous thread sharing across execution resources of multiple processor cores.

Dual-core processors provide double the processor functional units that can potentially be computationally utilized to execute computer instructions as compared to single core processors. As the number of cores is increased by a factor of "n", more instructions can be executed in parallel in the same processor. In n-core processor architectures, each processor core typically has dedicated instruction-sequencing units and execution units such that each processor core can operate independent of the other core. However, current n-core architectures do not utilize resources across the processor cores.

Multi-threaded systems may schedule and coordinate execution of multiple threads on separate processor cores. As additional processor cores are added to multi-core processor architectures, legacy software often must be rewritten or modified to utilize the additional processor cores. Each processor core typically includes a number of execution units, such as one or more fixed-point units, floating-point units, and branching units. The time required to execute instructions on different execution units in the same processor core may vary. Some techniques, such as simultaneous multithreading, can increase processing efficiency by executing instructions from more than one thread in different pipeline stages of the same processor core at the same time. Such techniques may improve processing throughput, but some execution units can still remain idle.

SUMMARY

An exemplary embodiment is a multi-core processor system supporting simultaneous thread sharing across execution resources of multiple processor cores. The multi-core processor system includes a first processor core with a first instruction queue and dispatch logic in communication with a first execution resource of the first processor core. The multi-core processor system also includes a second processor core with a second instruction queue and dispatch logic in communication with a second execution resource of the second processor core. The multi-core processor system additionally includes a high-speed execution resource bus coupling the first and second processor cores. The first instruction queue and dispatch logic is configured to issue a first instruction of a thread to the first execution resource and issue a second instruction of the thread over the high-speed execution resource bus to the second execution resource for simultaneous execution of the first and second instruction of the thread on the first and second processor cores.

Another exemplary embodiment is a method for performing reverse simultaneous multi-threading. The method includes receiving a first and second instruction of a thread at a first instruction sequencing unit of a first processor core, and issuing the first instruction to a first execution resource of the first processor core. The method also includes issuing the second instruction over a high-speed execution resource bus from the first processor core to a second processor core. The second processor core includes a second instruction sequencing unit and a second execution resource. The method further includes simultaneously executing the first instruction of the thread on the first execution resource and the second instruction of the thread on the second execution resource.

Other systems, methods, apparatuses, and/or design structures according to embodiments will be or become apparent to one with skill in the art upon review of the following drawings and detailed description. It is intended that all such additional systems, methods, apparatuses, and/or design structures be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments of the present invention provide reverse simultaneous multi-threading on a multi-processor system. Multi-threading systems typically take turns executing different threads on a processor core or execute separate threads in different pipelines of the same processor core. For example, if back-to-back or simultaneous floating-point instructions are encountered, execution of the second floating-point instruction is typically delayed until execution of the first floating-point instruction completes in the same processor core with a single floating-point unit instead of checking whether a floating-point unit of another processor core is available to execute the second floating point instruction. In exemplary embodiments, multiple processor cores make execution resources available such that execution of a single thread can be distributed between multiple processor cores for simultaneous execution of instructions in the same thread without software intervention, which is referred to herein as "reverse simultaneous multi-threading" (rSMT).

Figure 1:
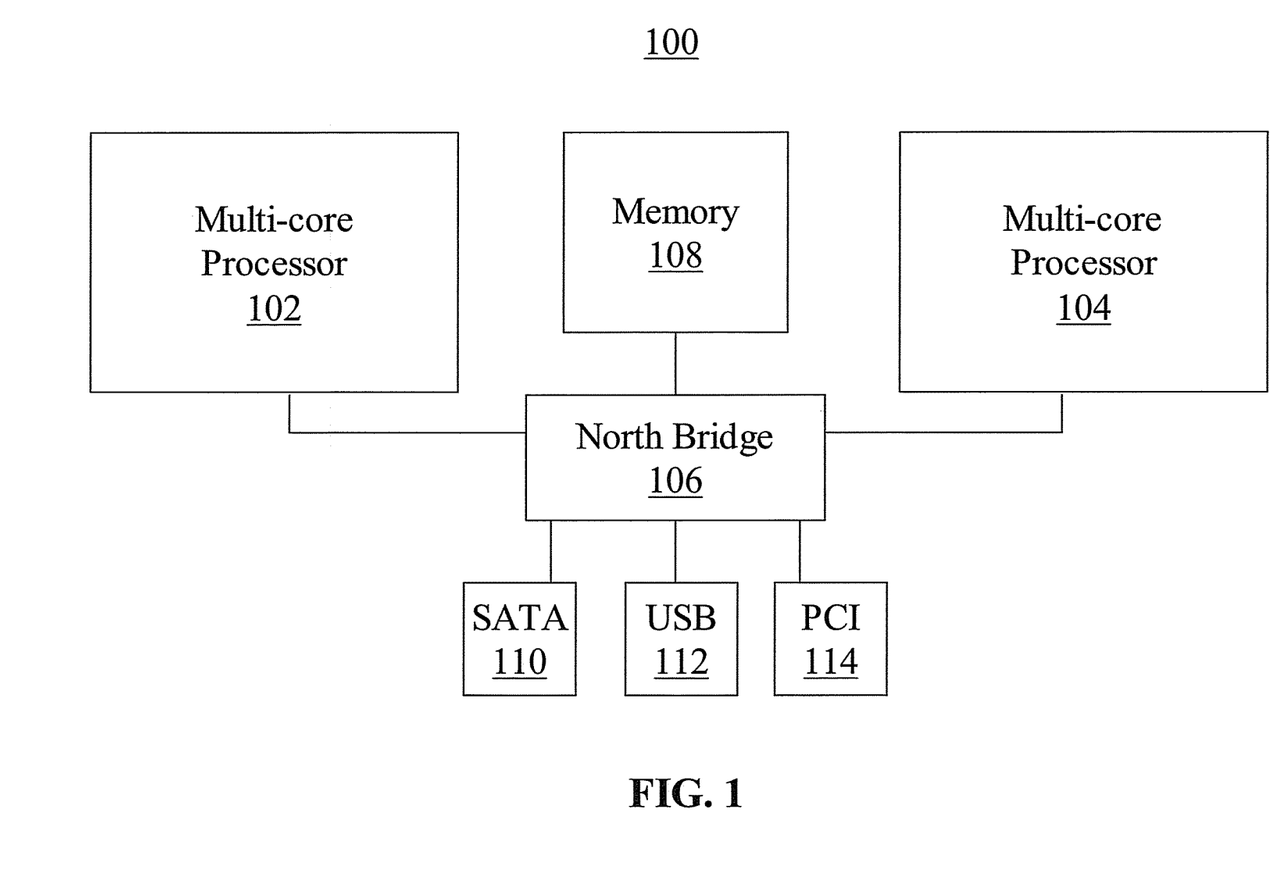
FIG. 1 depicts a system upon which reverse simultaneous multi-threading may be performed in exemplary embodiments.

FIG. 1 depicts a system 100 upon which rSMT may be performed in exemplary embodiments. FIG. 1 includes multi-core processors 102 and 104, each of which may include two or more processor cores implementing rSMT. The multi-core processors 102 and 104 are in connected to a north bridge 106, where north bridge 106 is a controller that handles communication between various elements of system 100. The north bridge 106 interfaces to memory 108, and various interfacing bus technologies known in the art, such as serial AT attachment (SATA) 110, universal serial bus (USB) 112, and peripheral component interconnect (PCI) 114. Instructions executed by the multi-core processors 102 and 104 can be passed through the north bridge 106 to the multi-core processors 102 and 104, and may be temporary stored in local caches within the multi-core processors 102 and 104.

Figure 2:
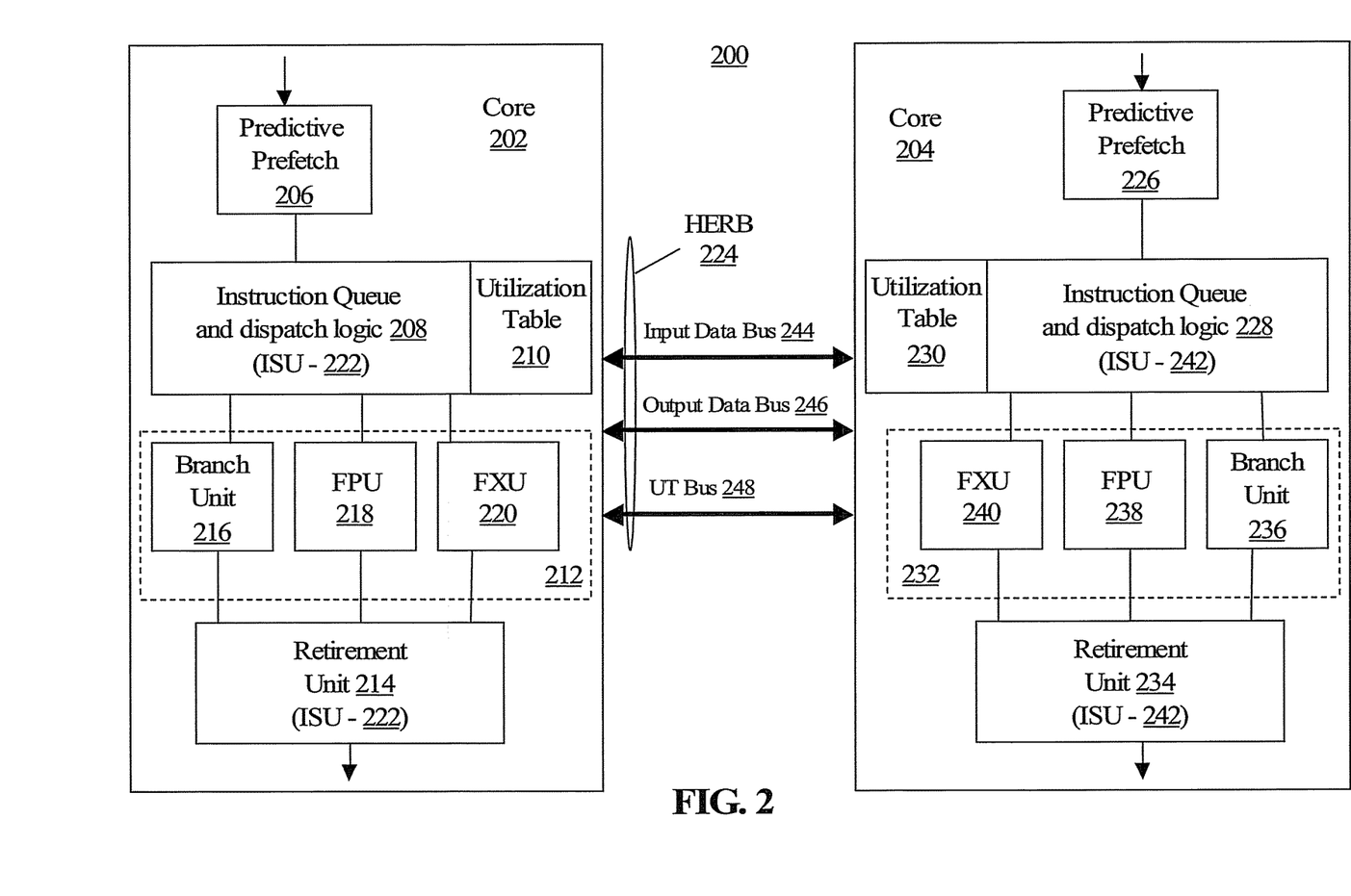
FIG. 2 depicts an example of processor cores configured to perform reverse simultaneous multi-threading.

FIG. 2 depicts an example of multi-core processor system 200 that includes processor cores 202 and 204 configured to perform rSMT. The processor cores 202 and 204 may be processor cores within either multi-core processor 102 or 104 of FIG. 1. In the example of FIG. 2, processor core 202 includes a predictive prefetch unit 206, instruction queue and dispatch logic 208, utilization tables 210, execution resources 212, and retirement unit 214. The execution resources 212 can include a variety of computer instruction execution resources to execute a variety of computer instructions known in the art. For example, the execution resources 212 may include a branch unit 216, a floating-point unit 218, and a fixed-point unit 220. The execution resources 212 can also include multiple instances of each type of execution resource. The instruction queue and dispatch logic 208 and retirement unit 214 may be combined into an instruction-sequencing unit (ISU) 222. A high-speed execution resource bus (HERB) 224 is used to exchange execution data between the processor cores 202 and 204.

Similar to processor core 202, processor core 204 includes a predictive prefetch unit 226, instruction queue and dispatch logic 228, utilization tables 230, execution resources 232, and retirement unit 234. The execution resources 232 can include a variety of computer instruction execution resources to execute a variety of computer instructions known in the art. For example, the execution resources 232 may include a branch unit 236, a floating-point unit 238, and a fixed-point unit 240. The execution resources 232 can also include multiple instances of each type of execution resource. The instruction queue and dispatch logic 228 and retirement unit 234 may be combined into an instruction-sequencing unit (ISU) 242.

The HERB 224 may include an input bus 244, an output bus 246, and utilization table exchange bus 248. The input bus 244 can be used to exchange inputs prior to instruction execution by the execution resources 212 and 232. The output bus 246 may be used to send the post-execution output of the execution resources 212 and 232 back to the opposite processor core 202 or 204 that requested guest execution of an instruction. The utilization table exchange bus 248 is used to exchange guest utilization tables from the utilization tables 210 and 230 between processor cores 202 and 204. The HERB 224 can utilize separate links in the input data bus 244, output data bus 246, and utilization table exchange bus 248 to maximize throughput and minimize latency.

In order to predict availability of processing cycles on the execution resources 212 and 232, predictive prefetch units 206 and 226 can prefetch instructions and data. In exemplary embodiments, the processor cores 202 and 204 support two modes of execution, a non-rSMT mode and an rSMT mode. In normal execution mode (non-rSMT mode), the predictive prefetch units 206 and 226 fetch instructions based on the address of instructions currently being executed by respective execution resources 212 and 232, as well as instructions surrounding the current execution memory range. In a similar fashion, the predictive prefetch units 206 and 226 fetch data based upon data addresses. In rSMT mode, the predictive prefetch units 206 and 226 fetch instructions deeper into memory for a current thread. Deeper fetching gives ISUs 222 and 242 more cycles to determine if guest execution resources are available and to schedule sending instructions to the guest execution resources. The fetching depth for instructions is also referred to as an instruction window.

The predictive prefetch units 206 and 226 enhance prefetching by providing support for a dynamically resizable instruction window depth. The ISUs 222 and 242 may determine when rSMT mode is beneficial on a thread-by-thread basis. Once the rSMT mode is activated, the predictive prefetch units 206 and 226 can limit prefetching to the current thread. In non-rSMT mode, the predictive prefetch units 206 and 226 can prefetch a number of shallow instruction streams or threads. A shallow instruction stream is a normal operation prefetch stream. In order to optimize rSMT, a deeper instruction stream is prefetched. The predictive prefetch units 206 and 226 may include a function to analyze the instruction composition of each stream. The predictive prefetch units 206 and 226 and the ISUs 222 and 242 assist in building utilization tables 210 and 230 n-cycles in advance (predicted future instructions) by analyzing the incoming instruction stream, including branch analysis. As an example, the predictive prefetch units 206 and 226 can perform comparisons of percentages of fixed-point operations relative to floating-point operations in a given stream. Furthermore, in some embodiments, the predictive prefetch units 206 and 226 analyze instruction dependency to determine when rSMT mode can be used. For instance, directly dependent instructions may inhibit simultaneous execution.

To support rSMT, each processor core 202 and 204 creates a host utilization table (HUT) in its respective utilization tables 210 and 230. Utilization table 210 holds state (busy/available) data for current and n-future cycles for each execution unit 216-220 of the execution resources 212. Likewise, utilization table 230 holds state (busy/available) data for current and n-future cycles for each execution unit 236-240 of the execution resources 232. Every cycle the utilization tables 210 and 230 are updated with state data in register arrays. Each ISU 222 and 242 analyzes the respective utilization tables 210 and 230 to determine availability of the execution resources 212 and 232. A copy of the HUT in each utilization table 210 and 230 is exchanged between the processor cores 202 and 204 over the utilization table exchange bus 248 every cycle. A copy of a HUT received at processor core 202 or 204 may also be stored in utilization tables 210 and 230 as a guest utilization table (GUT). For example, a HUT from processor core 202 is sent as a GUT and stored in utilization table 230 of processor core 204. An example of an arbitrary GUT or HUT is provided in Table 1 with N prediction cycles and M execution units.

TABLE 1

Example of arbitrary GUT/HUT

| | EU #1 | EU #2 | ... | EU #M |
|---|---|---|---|---|
| Current Utilization Bit (current cycle) | 0/1 | 0/1 | ... | 0/1 |
| Predictive Utilization Bit (1 cycle later) | 0/1 | 0/1 | ... | 0/1 |
| Predictive Utilization Bit (2 cycles later) | 0/1 | 0/1 | ... | 0/1 |
| ... | ... | ... | ... | ... |
| Predictive Utilization Bit (N cycles later) | 0/1 | 0/1 | ... | 0/1 |

Each of the processor cores 202 and 204 retains ownership and priority to issue instructions to its own execution resources 212 and 232. Guest processor core utilization is based on availability of otherwise unused execution resources 212 and 232. Therefore, processor core 202 may only issue an instruction to a targeted execution resource of execution resources 232 if processor core 204 is not utilizing the targeted execution resource.

Available "guest" execution resources 232 can be issued instructions from "host" processor core 202. Likewise, execution resources 212 are guest execution resources from the perspective of processor core 204 as the host. For instance, if a GUT received from processor core 204 (a guest relative to processor core 202) indicates that one or more of the execution resources 232 are available at a future time, processor core 202 can issue an instruction from a thread executing on processor core 202 to execute on the one or more available execution resources 232. Each ISU 222 and 242 can dispatch multiple instructions to guest processor cores. Operand steering logic of instruction queue and dispatch logic 208 and 228 directs instructions across input data bus 244 to a guest execution unit of execution resources 232 and 212. Result steering logic of retirement units 214 and 234 may direct instructions completed on a guest execution unit of execution resources 212 and 234 back to the respective host processor cores 202 and 204 via output data bus 246. The retirement units 214 and 234 track instructions dispatched to local (host) and remote (guest) execution resources 212 and 234, and predict when results of the instruction execution should return. Once results of instruction execution return, the instruction is retired from execution, and the results are written back to local register files of the respective processor cores 202 and 204.

Figure 3:
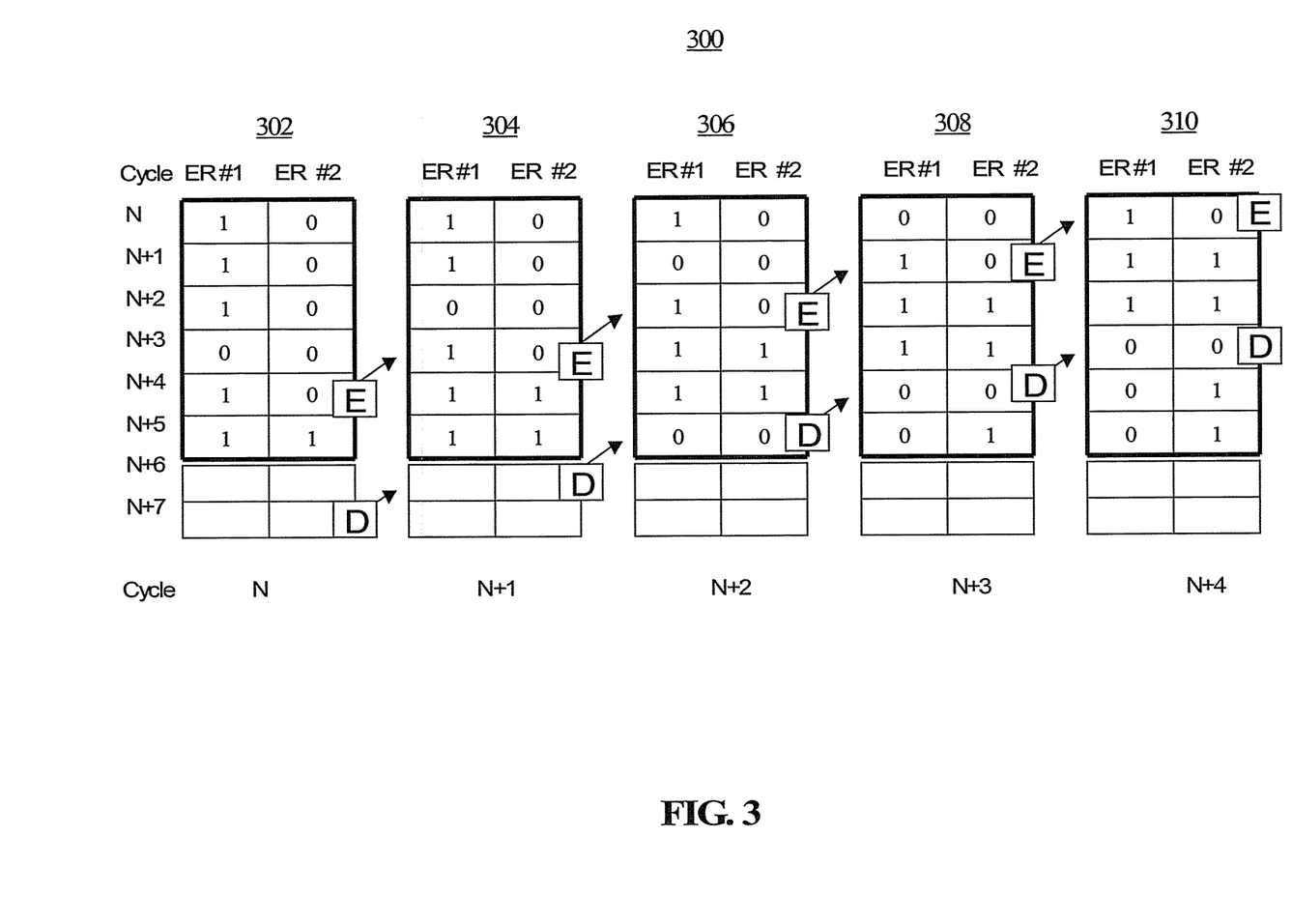
FIG. 3 depicts an example of a reverse simultaneous multi-threading instruction acceptance timing diagram.

FIG. 3 depicts an example of an rSMT instruction-acceptance timing diagram 300 that can be implemented in exemplary embodiments. Utilization table 302 represents an example of a HUT generated by processor core 204, and is received as a GUT by processor core 202 of FIG. 2. In other words, utilization table 302 is equivalent to the current cycle (N) execution state of execution resources 232 of FIG. 2 and predicted cycle (N+1 to N+5) execution states forming an instruction window based on prefetching by predictive prefetch unit 226 of FIG. 2. Each column of the utilization table 302 indicates state values for different execution resources. For instance, ER #1 may map to FPU 238 and ER #2 may map to FXU 240 of FIG. 2. Although the example of FIG. 3 is limited to two columns per utilization table, it will be understood that each execution resource or unit can have a dedicated state column to support rSMT. Moreover, the HERB 224 of FIG. 2 can be encoded or one-hot.

ISU 222 of FIG. 2 can analyze the utilization table 302, which may be received and stored as a GUT in utilization table 210 of FIG. 2, to determine if issuing instructions to execution resources 232 of FIG. 2 is possible. Bits or flags in row (cycle) N of utilization table 302 are referred to as utilization bits, since these bits indicate the state of the associated execution resources 232 in the current cycle. Bits or flags in rows (cycles) N+1 to N+5 of utilization table 302 are referred to as prediction bits, which indicate anticipated execution states of the associated execution resources 232. Based on the prediction and utilization bits of utilization table 302, the ISU 222 can determine if issuing instructions to processor core 204 of FIG. 2 will yield a net gain in performance. If rSMT is determined to be beneficial by the ISU 222, the ISU 222 issues the instructions to the execution resources 232. The instructions and the utilization table 302 data are transmitted across the HERB 224 of FIG. 2.

Whereas a typical instruction window of prefetched instructions may include a limited number of instructions per thread, for instance four instructions, the predictive prefetch units 206 and 226 of FIG. 2 can dynamically extend the instruction window depth. For example, utilization table 302 includes five predicted states in cycles N+1 to N+5 based on the extended instruction window depth upon which ISUs 222 and 242 perform analysis for rSMT.

In the example of FIG. 3, ISU 222 of FIG. 2 determines that rSMT is beneficial if execution of an instruction that is part of a thread executing on processor core 202 can begin on execution resources 232 of processor core 204 in "n+x" cycles, where "x" is an arbitrary number of cycles in the future. The guest execution start cycle is referred to as cycle E, which is at cycle N+4 in utilization table 302. In this example, a value of "1" in cycle N indicates that a given execution resource is busy executing, a value of "1" in cycles N+1 to N+5 indicate a prediction that the given execution resource will be busy executing, and a value of "0" indicates that the given execution resource is expected to be available. Based on the instruction, the ISU 222 of FIG. 2 anticipates how many cycles should elapse until a result of instruction execution is returned from the processor core 204. The cycle that execution resources 232 returns result data is a guest execution delivery cycle, also referred to as cycle D. For utilization table 302, cycle D is expected at cycle N+7, which is beyond the instruction window depth.

Utilization tables 304, 306, 308, and 310 illustrate examples of incremental changes as cycles elapse. In utilization table 304, cycle E is at cycle N+3 and cycle D is still outside of the range of utilization table 304 at cycle N+6. In utilization table 306, cycle E is at cycle N+2 and cycle D at cycle N+5. In utilization table 308, cycle E is at cycle N+1, and cycle D is at cycle N+4. Since cycle E is still available (equal to zero) for ER #2 of utilization table 308 at cycle N+1, the ISU 222 of FIG. 2 can issue the instruction to execution resources 232, such that the instruction is ready to execute by ER #2 during the next cycle. In utilization table 310, cycle E is at cycle N, and cycle D is at cycle N+3. Since cycle E at cycle N of utilization table 310 is still zero for ER #2, ISU 242 did not issue an unpredicted instruction to ER #2. The ISU 222 assumes that the instruction was accepted and executed by processor core 204 and awaits the results at cycle D, where the instruction will be retired by retirement unit 214 of FIG. 2.

Figure 4:
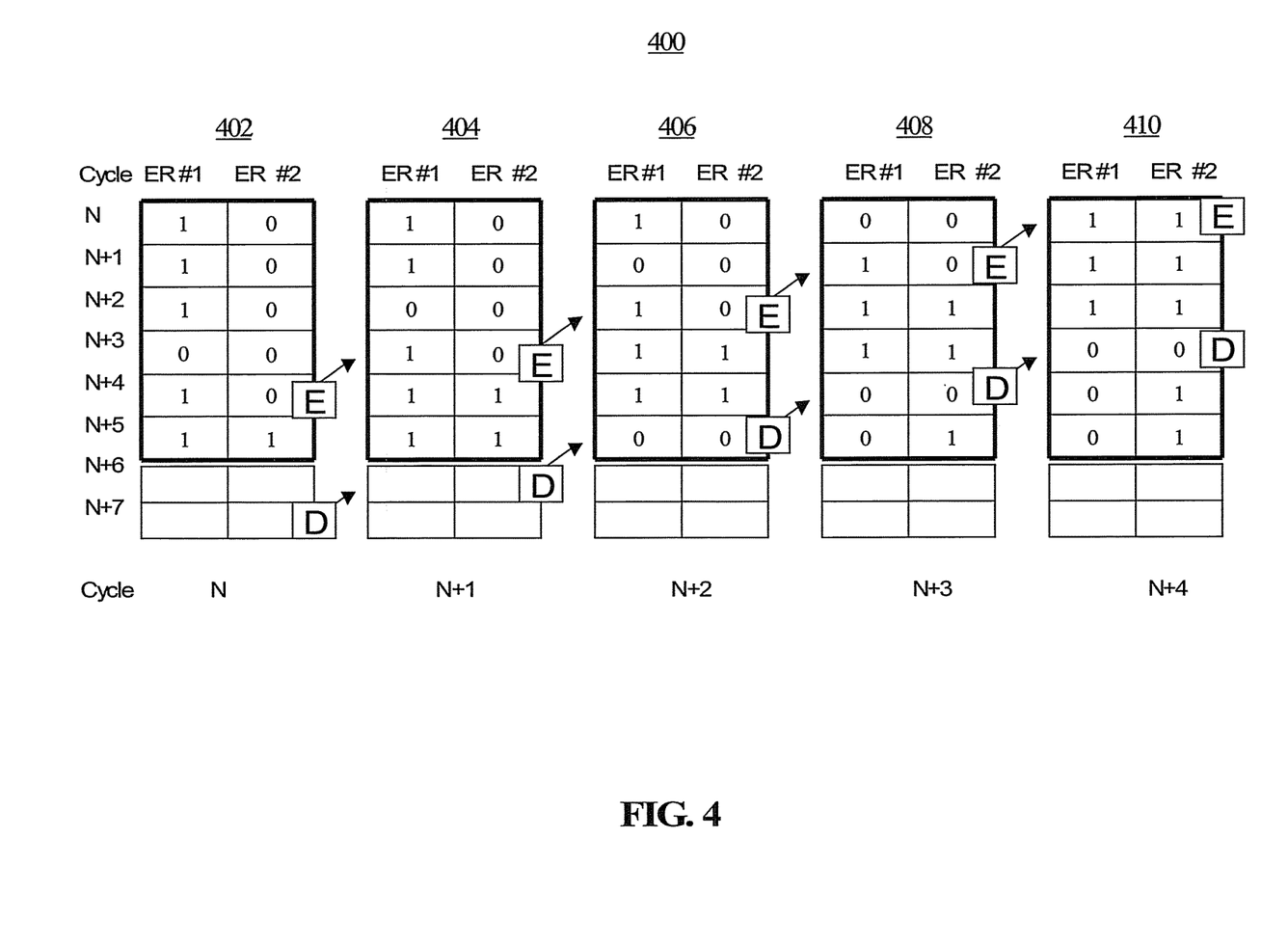
FIG. 4 depicts an example of a reverse simultaneous multi-threading instruction rejection timing diagram.

FIG. 4 depicts an example of an rSMT instruction-rejection timing diagram 400. The example of FIG. 4 proceeds the same as the rSMT instruction-acceptance timing diagram 300 of FIG. 3 between utilization tables 302-308 of FIG. 3 and utilization tables 402-408 of FIG. 4. For instance, in utilization table 402, cycle E is at cycle N+4 and cycle D is outside of the range of utilization table 402 at cycle N+7 for ER #2. Similarly, cycle E advances for ER #2 in utilization tables 404, 406, 408, and 410 to cycles N+3, N+2, N+1, and N, while cycle D advances for ER #2 in utilization tables 404, 406, 408, and 410 to cycles N+6, N+5, N+4, and N+3. However, the difference between an acceptance and a rejection occurs based on cycle N of utilization table 410 versus cycle N of utilization table 310 of FIG. 3. While cycle E for ER #2 at cycle N+1 of utilization table 408 predicted a zero indicating the ER #2 should be available for rSMT in the next cycle, at utilization table 410 cycle E for ER #2 at cycle N is a one, which indicates that the ISU 242 of FIG. 2 issued an unpredicted instruction. Since ER #2 is busy, it cannot accept remote work at cycle E of utilization table 410.

When an instruction rejection occurs, there are several possible resolutions. In one embodiment, the processor core 204 of FIG. 2 queues the remote instruction from processor core 202, and completes execution of the remote instruction once the execution resources 232 are available. In an alternate embodiment, processor core 202 cancels the request for guest instruction execution on the processor core 204 and executes the instruction locally. In a further embodiment, the processor core 202 cancels the current rSMT action and retries an rSMT action in a future cycle.

Figure 5:
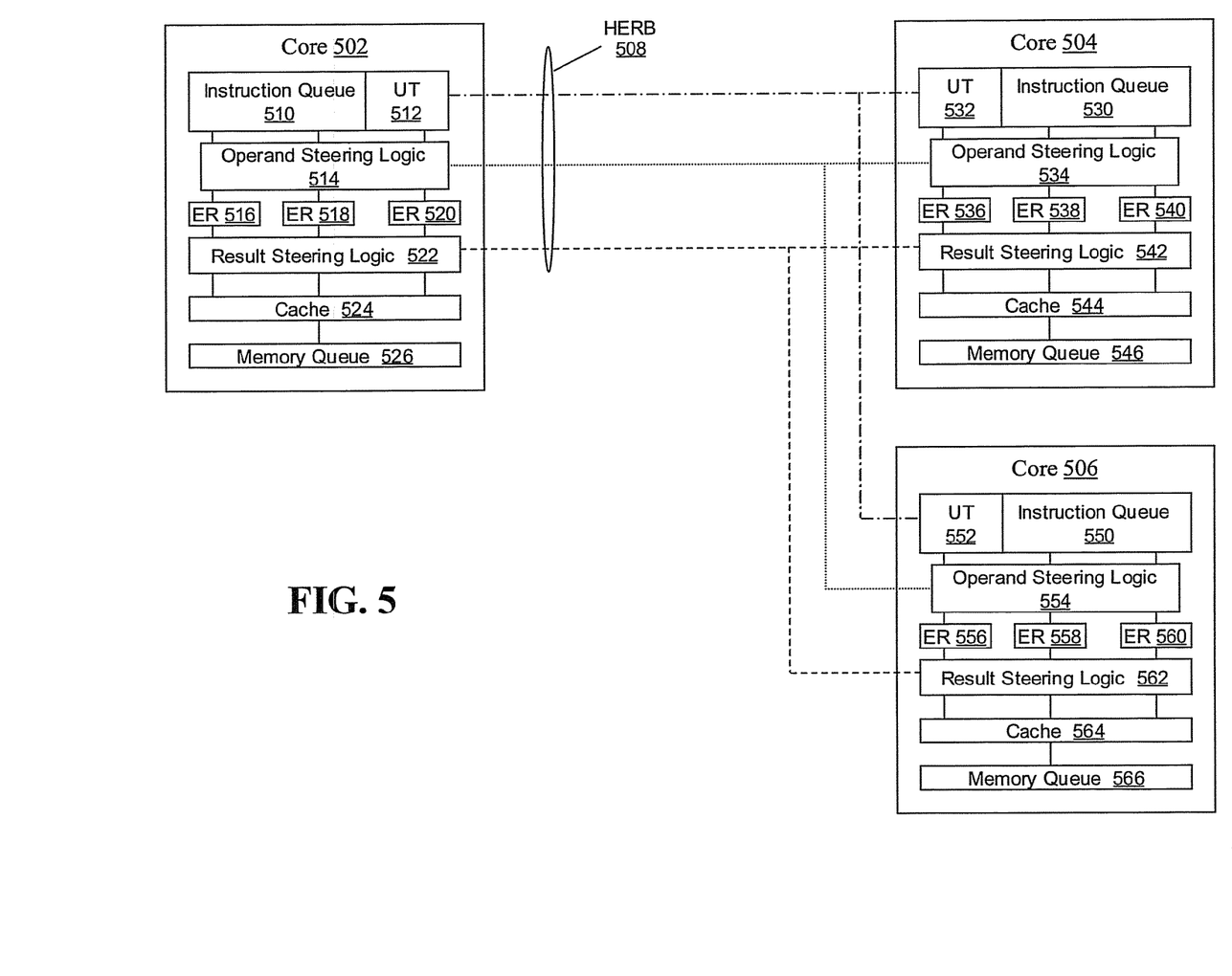
FIG. 5 depicts a further example of processor cores configured to perform reverse simultaneous multi-threading.

FIG. 5 depicts a further example of processor cores configured to perform reverse simultaneous multi-threading. In FIG. 5, processor cores 502, 504, and 506 are in communication via HERB 508 to perform rSMT. Processor core 502 includes instruction queue 510, utilization table 512, operand steering logic 514, and execution resources 516, 518, and 520. Processor core 502 further includes result steering logic 522, a cache 524, and a memory queue 526. Similarly, processor core 504 includes instruction queue 530, utilization table 532, operand steering logic 534, and execution resources 536, 538, and 540. Processor core 504 also includes result steering logic 542, a cache 544, and a memory queue 546. Processor core 506 includes instruction queue 550, utilization table 552, operand steering logic 554, and execution resources 556, 558, and 560. Processor core 506 further includes result steering logic 562, a cache 564, and a memory queue 566. In the example of FIG. 5, pairings of instruction queues 510, 530, and 550 with operand steering logic 514, 534, and 554 each be may be equivalent to the instruction queue and dispatch logic 208 of FIG. 2. In similar fashion, the result steering logic 522, 542, and 562 may be equivalent to retirement unit 214 of FIG. 2.

HERB 508 of FIG. 5 depicts possible logical links between the processor cores 502, 504, and 506. HERB 508 can be implemented using point-to-point or mesh connections to form logical links. For example, the utilization tables 512, 532, and 552 can be logically linked for exchanging GUTs. The operand steering logic 514, 534, and 554 may be logically linked for issuing instructions between the processor cores 502, 504, and 506. The result steering logic 522, 542, and 562 can be logically linked to return results from guest execution resources back to a host processor core. Cache 524, 544, and 564, as well as memory queues 526, 546, and 566 may be used to store execution results and register files.

As additional processor cores are added, more guest execution resources become available to each processor core. For instance, execution resources 536-540 and 556-560 are guest execution resources relative to processor core 502, while execution resources 516-520 and 556-560 are guest execution resources relative to processor core 504, and execution resources 516-520 and 536-540 are guest execution resources relative to processor core 506. The processor cores 502-506 need not physically reside within the same device. It may be preferable to keep the processor cores 502-506 in close proximity to minimize latency of the HERB 508.

Figure 6:
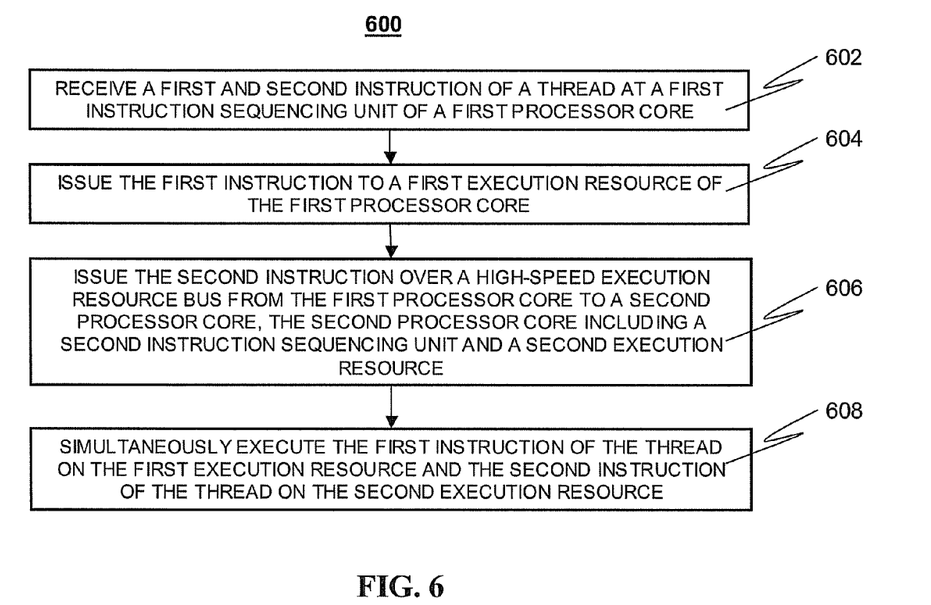
FIG. 6 depicts a process for performing reverse simultaneous multi-threading in accordance with an exemplary embodiment.

Turning now to FIG. 6, a process 600 for performing rSMT is described in reference to the multi-core processor system 200 of FIG. 2 and in accordance with exemplary embodiments. At block 602, a first and second instruction of a thread is received at ISU 222 of processor core 202. The thread is a sequence of instructions that can include fixed-point, floating-point, and/or vectoring instructions in addition to load and store instructions. The predictive prefetch unit 206 can prefetch instructions of the thread on the processor core 202 to a dynamically sized instruction window depth, and locate the first and second instructions in the prefetched instructions. For instance, the first and second instructions may be non-dependent floating-point instructions.

ISU 222 also receives a GUT, such as utilization table 302 of FIG. 3, from processor core 204, which can be stored in utilization table 210. The received utilization table includes current and predictive utilization indicators of execution resources 232. The ISU 222 can locate a predicted availability of the execution resources 232 in the received utilization table. In response to the ISU 222 determining that execution of instructions of the thread can be shared with execution resources 232, the ISU 222 may scheduling the issuing of the second instruction to align with the located predicted availability of the execution resources 232.

At block 604, the ISU 222 issues the first instruction to one of the execution resources 212 of first processor core 202. At block 606, the ISU 222 issues the second instruction over HERB 224 to processor core 204. Based on expected latency, the ISU 222 can control the timing of when the second instruction is issued relative to the first instruction. For instance, the second instruction may be issued one or more cycles before the first instruction.

At block 608, the first instruction of the thread and the second instruction of the thread are simultaneously executed on the execution resources 212 and 232. For instance, two floating-point instructions from the same thread can be executed at the same time if FPU 238 is available rather than waiting for the FPU 218 to complete execution of both floating-point instructions. The ISU 222 can also track the issuing of the first and second instructions, and write back execution results of the first and second instructions, where the execution results of the second instruction are received over the HERB 224. The ISU 222 may also monitor received utilization tables from processor core 204 to check whether a utilization indicator of the execution resources 232 indicates availability in a scheduled execution cycle of the second instruction. In response to determining that the execution resources 232 are unavailable in the scheduled execution cycle of the second instruction, a rejection action may be taken. Upon rejection, the second instruction may be queued at the processor core 204 for later execution, the second instruction may be executed at the processor core 202, or a later cycle can be scheduled to reissue the second instruction to the processor core 204.

Depending upon the implementation of the multi-core processor system 200, the ISU 222 can issue instructions to the ISU 242 for queuing and dispatching to the execution resources 232, or the ISU 222 can directly issue instructions to the execution resources 232, bypassing the ISU 242. The process 600 may be implemented simultaneously from the perspective of processor core 204, with processor core 204 acting as a host to issue instructions to execution resources 212 of processor core 202 as a guest. Also as previously described in reference to FIG. 5, additional processor cores, such as processor core 506 relative to processor cores 502 and 504, can provide additional guest execution resources. One or more additional instructions of the thread may be issued to one or more guest execution resources of one or more additional processor cores in response to identifying predicted availability in utilization tables from the one or more additional processor cores.

Figure 7:
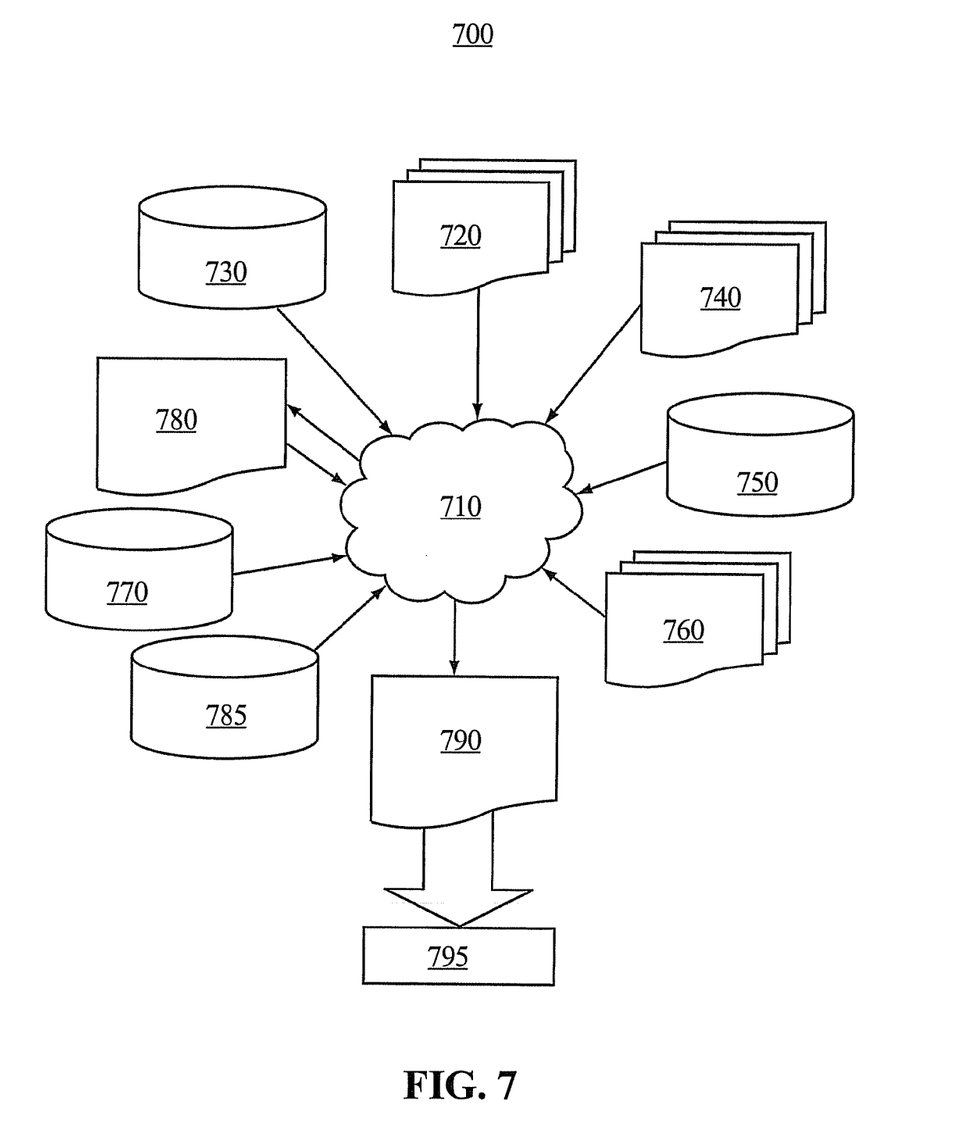
FIG. 7 is a flow diagram of a design process used in semiconductor design, manufacture, and/or test.

FIG. 7 shows a block diagram of an exemplary design flow 700 used for example, in semiconductor IC logic design, simulation, test, layout, and manufacture. Design flow 700 includes processes and mechanisms for processing design structures or devices to generate logically or otherwise functionally equivalent representations of the design structures and/or devices described above and shown in FIGS. 1-6. The design structures processed and/or generated by design flow 700 may be encoded on machine readable transmission or storage media to include data and/or instructions that when executed or otherwise processed on a data processing system generate a logically, structurally, mechanically, or otherwise functionally equivalent representation of hardware components, circuits, devices, or systems. Design flow 700 may vary depending on the type of representation being designed. For example, a design flow 700 for building an application specific IC (ASIC) may differ from a design flow 700 for designing a standard component. FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown in FIGS. 1-6. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown in FIGS. 1-6 to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in a ICES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-6. In one embodiment, design structure 790 may comprise a compiled, executable HDL simulation model that functionally simulates the devices shown in FIGS. 1-6.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-6. Design structure 790 may then proceed to a stage 795 where, for example, design structure 790: proceeds to tape-out, is released to manufacturing, is released to a mask house, is sent to another design house, is sent back to the customer, etc.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Technical effects include simultaneous execution of instructions from the same thread in execution resources of separate processor cores. Exchanging predicted utilization data between processor cores enables host processor cores to identify potentially unused execution resources on guest processor cores. Issuing instructions to guest processor cores can effectively provide temporarily enlarged superscalar performance by harnessing the unused execution resources. No additional or shared execution units are added; rather, cycles where execution resources are otherwise idle can be utilized by a thread hosted on another processor core.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A multi-core processor system comprising:
   a first processor core comprising a first instruction queue and dispatch logic in communication with a first execution resource of the first processor core, wherein the first processor core further comprises a utilization table configured to receive current and predictive utilization indicators of a second execution resource over a high-speed execution resource bus;
   a second processor core comprising a second instruction queue and dispatch logic in communication with the second execution resource of the second processor core; and
   the high-speed execution resource bus coupling the first and second processor cores, wherein the first instruction queue and dispatch logic is configured to issue a first instruction of a thread to the first execution resource and issue a second instruction of the thread over the high-speed execution resource bus to the second execution resource for simultaneous execution of the first and second instruction of the thread on the first and second processor cores.

2. The system of claim 1 wherein the first processor core further comprises:
   a predictive prefetch unit configured to perform prefetching of instructions of the thread to a dynamically sized instruction window depth; and
   the first instruction queue and dispatch logic is further configured to locate the first and second instructions in the prefetched instructions and determine when to issue the second instruction of the thread over the high-speed execution resource bus to the second execution resource.

3. The system of claim 1 wherein the first processor core further comprises:
   a retirement unit configured to track the issuing of the first and second instructions, receive execution results of the second instruction over the high-speed execution resource bus, and write back execution results of the first and second instructions.

4. The system of claim 1 wherein the first and second execution resources are one or more of: a fixed-point unit, a floating-point unit, and a branch unit.

5. The system of claim 1 wherein the second instruction queue and dispatch logic is configured to issue a first instruction of a second thread to the second execution resource and issue a second instruction of the second thread over the high-speed execution resource bus to the first execution resource for simultaneous execution of the first and second instruction of the second thread on the first and second processor cores, and the second processor core further comprises:
   a second utilization table configured to receive current and predictive utilization indicators of the first execution resource over the high-speed execution resource bus;
   a retirement unit configured to track the issuing of the first and second instructions of the second thread, receive execution results of the second instruction of the second thread over the high-speed execution resource bus, and write back execution results of the first and second instructions of the second thread;
   a predictive prefetch unit configured to perform prefetching of instructions of the second thread to a dynamically sized instruction window depth; and
   the second instruction queue and dispatch logic is further configured to locate the first and second instructions of the second thread in the prefetched instructions and determine when to issue the second instruction of the second thread over the high-speed execution resource bus to the first execution resource.

6. The system of claim 1 further comprising one or more additional processor cores in communication with the first and second processor cores, wherein one or more execution resources of each processor core are configurable as guest execution resources.

7. The system of claim 1 wherein the first and second processor cores are located on physically separate devices.

8. The system of claim 1 wherein the second execution resource is configured to receive the second instruction directly from the first instruction queue and dispatch logic, bypassing the second instruction queue and dispatch logic.

9. The system of claim 1 wherein the second instruction queue and dispatch logic is configured to receive the second instruction from the first instruction queue and dispatch logic.

10. A method for performing reverse simultaneous multi-threading, the method comprising:
    receiving a first and second instruction of a thread at a first instruction sequencing unit of a first processor core;
    receiving a utilization table at the first processor core from a second processor core, the utilization table comprising current and predictive utilization indicators of a second execution resource;
    locating a predicted availability of the second execution resource in the utilization table;
    scheduling the issuing of the second instruction to align with the located predicted availability of the second execution resource;
    issuing the first instruction to a first execution resource of the first processor core;
    issuing the second instruction over a high-speed execution resource bus from the first processor core to a second processor core, the second processor core comprising a second instruction sequencing unit and a second execution resource; and
    simultaneously executing the first instruction of the thread on the first execution resource and the second instruction of the thread on the second execution resource.

11. The method of claim 10 further comprising:
prefetching instructions of the thread on the first processor core to a dynamically sized instruction window depth;
locating the first and second instructions in the prefetched instructions; and
determining when to issue the second instruction of the thread over the high-speed execution resource bus to the second execution resource.

12. The method of claim 10 further comprising:
tracking the issuing of the first and second instructions at the first instruction sequencing unit;
receiving execution results of the second instruction over the high-speed execution resource bus; and
writing back execution results of the first and second instructions.

13. The method of claim 10 wherein the first and second execution resources are one or more of: a fixed-point unit, a floating-point unit, and a branch unit.

14. The method of claim 10 wherein the second processor core is configured to perform:
prefetching instructions of a second thread to a dynamically sized instruction window depth;
locating a first and second instruction of the second thread in the prefetched instructions;
issuing the first instruction of the second thread to the second execution resource;
issuing the second instruction of the second thread over the high-speed execution resource bus to the first execution resource for simultaneous execution of the first and second instruction of the second thread on the first and second processor cores;
tracking the issuing of the first and second instructions of the second thread;
receiving execution results of the second instruction of the second thread over the high-speed execution resource bus; and
writing back execution results of the first and second instructions of the second thread.

15. The method of claim 10 further comprising:
receiving utilization tables from one or more additional processor cores;
issuing one or more additional instructions of the thread to one or more guest execution resources of one or more additional processor cores in response to identifying predicted availability in the utilization tables from the one or more additional processor cores.

16. The method of claim 10 wherein the first and second processor cores are located on physically separate devices.

17. The method of claim 10 further comprising:
receiving the second instruction at the second execution resource directly from the first instruction sequencing unit, and bypassing the second instruction sequencing unit.

18. The method of claim 10 further comprising:
receiving the second instruction from the first instruction sequencing unit at the second instruction sequencing unit; and
dispatching the second instruction to the second execution resource from the second instruction sequencing unit.

19. The method of claim 10 further comprising:
checking whether the current and predictive utilization indicators of the second execution resource indicates availability in a scheduled execution cycle of the second instruction;
in response to determining that the second execution resource indicates unavailability in the scheduled execution cycle of the second instruction, performing one of:
queuing the second instruction at the second processor core for later execution;
executing the second instruction at the first processor core; and
scheduling a later cycle to issue the second instruction to the second processor core.

20. A design structure tangibly embodied in a non-transitory machine-readable storage medium for designing, manufacturing, or testing an integrated circuit, the design structure comprising:
a multi-core processor system comprising:
a first processor core comprising a first instruction queue and dispatch logic in communication with a first execution resource of the first processor core, wherein the first processor core further comprises a utilization table configured to receive current and predictive utilization indicators of a second execution resource over a high-speed execution resource bug;
a second processor core comprising a second instruction queue and dispatch logic in communication with the second execution resource of the second processor core; and
the high-speed execution resource bus coupling the first and second processor cores, wherein the first instruction queue and dispatch logic is configured to issue a first instruction of a thread to the first execution resource and issue a second instruction of the thread over the high-speed execution resource bus to the second execution resource for simultaneous execution of the first and second instruction of the thread on the first and second processor cores.

21. The design structure of claim 20, wherein the design structure comprises a netlist.

22. The design structure of claim 20, wherein the design structure resides on the machine-readable storage medium as a data format used for the exchange of layout data of integrated circuits.

* * * * *